UNITED STATES PATENT OFFICE.

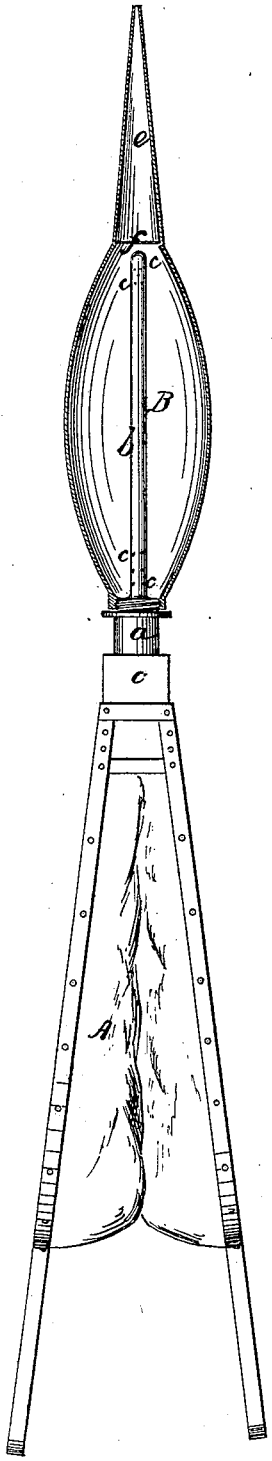

EBENEZER COOK, OF NEW YORK, N. Y.

IMPROVEMENT IN INSECT-BELLOWS.

Specification forming part of Letters Patent No. 149,995, dated April 21, 1874; application filed March 17, 1874.

*To all whom it may concern:*

Be it known that I, EBENEZER COOK, of the city, county, and State of New York, have invented a new and Improved Insect-Bellows; and that the following is a full, clear, and exact description of the same, reference being had to the accompanying drawings and to the letters of reference marked thereon, making a part of this specification.

This invention is in the nature of an improvement in an apparatus for injecting fine particles of substances obnoxious to insect life, and also in the means hereinafter described of atomizing the insect-poison; and the invention consists in a bellows combined with a perforated tube and a receptacle, strainer, and nozzle, as and for the purpose hereinafter described.

It is well known that two great difficulties exist in distributing powder obnoxious to insect life for the purpose of driving them out of their hiding-places and killing them. These difficulties are, first, to get the powder sufficiently fine to enable it to penetrate every crevice, and to enable the insect to eat it, or, in fact, inhale it; and, second, to force the powder into the most minute crannies, and in any direction. These difficulties, it is believed, are fully obviated by my invention, as will be seen from the following description and accompanying drawings, wherein the figure shows an edge view, partly in section, showing interior tube.

A is a hand-bellows of the ordinary construction, having an opening in its pointed end, to which is affixed, in any suitable manner, a cylindrical box, $a$, within which is fitted a valve, in such manner as will allow it to open outward. Fastened to the box $a$ is a projecting tube, $b$. This tube has in it a series of perforations, $c$, near its base and upper end. Tightly screwed to the base of the tube $b$ is a receptacle, B, terminating at its front end in a nozzle, $e$, and with a gauze strainer, $f$, at the base of the nozzle.

My device being constructed substantially as above described, it is operated as follows: The receptacle B is unscrewed from the base of the pipe $b$, and any powder known to be fatal to insect life is placed within it. The receptacle is then screwed in place again, and the bellows worked in the ordinary manner, when the air will be forced into the tube $b$ and out of the openings $c$ therein, agitating the whole mass of powder within the receptacle, the finer portions of which are forced through the gauze screen $f$, and out at the end of the nozzle $e$, into any direction or crevice it is desired to place it.

The valve in the cylindrical box $a$, opening only outward, does not interfere with the free passage of air from the bellows into the tube $b$, but it does prevent the powder from working into the bellows and interfering with its operation.

It will be seen from the foregoing description that by my device not only do the very finest particles or atoms of powder come within the influence of the driving-blast of the bellows, but they are readily forced out of the nozzle in any desired position or direction.

Having thus described my invention, what I claim as new, and desire to secure by Letters Patent, is—

The herein-described bellows for distributing insect-powder, provided with the perforated tube $b$, having a valve at its base, the powder-receptacle B, strainer $f$, and nozzle $e$, all constructed, arranged, and operating as specified.

EBENEZER COOK.

Witnesses:
G. M. PLYMPTON,
H. L. WATTENBERG.